(12) United States Patent
Gitnes

(10) Patent No.: US 9,670,999 B2
(45) Date of Patent: Jun. 6, 2017

(54) LOW FRICTION TRAVEL LIMITING STOP MODULE FOR A ROTATIONAL DRIVE SYSTEM

(71) Applicant: Moog Inc., East Aurora, NY (US)

(72) Inventor: Seth Gitnes, Snohomish, WA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 14/993,121

(22) Filed: Jan. 12, 2016

(65) Prior Publication Data

US 2016/0201775 A1 Jul. 14, 2016

Related U.S. Application Data

(60) Provisional application No. 62/102,731, filed on Jan. 13, 2015.

(51) Int. Cl.
*F16H 25/20* (2006.01)
*F16H 25/24* (2006.01)

(52) U.S. Cl.
CPC ..... *F16H 25/2015* (2013.01); *F16H 25/2454* (2013.01)

(58) Field of Classification Search
CPC .................................................. F16H 25/2015
See application file for complete search history.

(56) References Cited

U.S. PATENT DOCUMENTS

| 2,685,350 | A | 8/1954 | Falk |
| 2,820,600 | A * | 1/1958 | Brunner ................. B64C 13/00 |
| | | | 192/141 |
| 5,024,395 | A | 6/1991 | Kranz |
| 6,722,485 | B1 * | 4/2004 | Gitnes .................... B64C 13/28 |
| | | | 188/82.2 |
| 2004/0065522 | A1 | 4/2004 | Gitnes et al. |
| 2015/0018155 | A1 | 1/2015 | Gitnes |

* cited by examiner

*Primary Examiner* — Mark Manley
(74) *Attorney, Agent, or Firm* — Hodgson Russ LLP

(57) ABSTRACT

A stop module halts rotation of a shaft of a rotational drive system when an axial stroke limit is reached without the use of frictional brake plates. The module has a fixed nut and a pawl carrier coaxially mounted on the shaft for axial travel along the shaft and rotation with the shaft. The pawl carrier includes a screw portion mated with the nut such that rotation of the pawl carrier with the shaft causes the pawl carrier to travel axially along the shaft. A pawl member is pivotally coupled to the pawl carrier, and a stop element is fixed at an axial limit location. The pawl carrier is axially displaceable from a non-limit position wherein the pawl member is clear of the stop element during rotation to a limit position wherein the pawl member is interfered with by the stop element during rotation to stop rotation of the shaft.

6 Claims, 6 Drawing Sheets

LOW FRICTION TRAVEL LIMITING STOP MODULE FOR A ROTATIONAL DRIVE SYSTEM

FIELD OF THE INVENTION

The present invention relates to a travel-limiting stop module for controlling the number of rotations of a rotational drive system to provide a mechanical stop at either end or both ends of a predefined stroke.

BACKGROUND OF THE INVENTION

Rotary drive systems typically include a screw threadably mated with a nut, wherein relative rotation between the screw and nut is accompanied by axial displacement between the screw and nut. This axial displacement is used to drive a linear stroke of an actuating mechanism. In such rotary drive systems, it is often necessary to provide a stop module to mechanically limit the linear stroke extent by accurately limiting the number of revolutions the system can rotate in either rotational direction or in both rotational directions.

FIG. 1 illustrates a rotational drive system 1 comprising an input shaft 2 rotatable about an axis 3 and arranged to drive rotation of output shaft 4 about axis 3. Output shaft 4 may be used, for example, to supply rotational power for driving the stroke of an actuator rod (no shown). Rotational drive system 1 also comprises a currently known stop module 5 of the prior art. Stop module 5 includes a travelling nut 6 on a screw shaft 7 mounted to rotate with input shaft 2, wherein the nut 6 moves axially with each revolution of input shaft 2 and screw shaft 7. When it reaches a travel limit end, nut 6 compresses a stack of alternating rotor/stator brake plates 8A, 8B and several Belleville springs 9 to arrest the rotating motion of input shaft 2 (i.e. "lock up"). Nut 6 includes an Acme screw thread 6A to allow stop module 5 to overcome static friction and unlock when input shaft 2 is rotated in the opposite direction after a lock-up event. Brake plates 8A, 8B introduce undesired power losses into the system in the form of viscous drag, particularly at low temperatures. Brake plates 8A, 8B are also subject to wear over time, which can alter the stroke resulting length and lead to over-travel beyond the intended limit.

There is a need for an improved stop module that significantly reduces the viscous drag imposed on the rotational drive system, particularly at low operating temperatures, increases the overall efficiency of the system, and eliminates loss of accuracy in the predetermined travel limits due to wear.

SUMMARY OF THE INVENTION

The present invention provides a stop module for halting rotation of a shaft of a rotational drive system when an axial stroke limit is reached. The stop module comprises a nut at a fixed location in an axial direction of the shaft, and a pawl carrier coaxially mounted on the shaft for axial travel along the shaft and rotation with the shaft, wherein the pawl carrier includes a screw portion mated with the nut such that rotation of the pawl carrier with the shaft causes the pawl carrier to travel axially along the shaft. At least one pawl member is pivotally coupled to the pawl carrier, and at least one stop element is fixed at an axial limit location in an axial direction of the shaft, wherein the stop element projects radially inward toward the rotational axis of the shaft. The pawl carrier is axially displaceable from a non-limit position wherein the pawl member is clear of the stop element in all rotational positions of the pawl carrier about the rotational axis of the shaft to a limit position wherein the pawl member is interfered with by the stop element as the pawl carrier rotates about the rotational axis of the shaft so as to stop rotation of the input shaft and pawl carrier. In one embodiment, the pawl carrier carries two pawl members arranged 180° apart about the rotational axis, and two axial limit locations are provided, each limit location having a pair of stop elements arranged 180° apart about the rotational axis.

The stop module may comprise a housing in which the pawl member is received, and the stop element(s) may projects inwardly from an inner wall surface of the housing. The housing may have an opening through which the shaft extends into the housing, and the nut may be arranged at the opening of the housing. The pawl carrier and pawl members are resettable by counter-rotating the shaft after the pawl carrier has reached a limit position.

BRIEF DESCRIPTION OF THE DRAWING VIEWS

The invention will be described in detail below with reference to the accompanying drawing figures, in which.

DETAILED DESCRIPTION OF THE INVENTION

Figure 1:
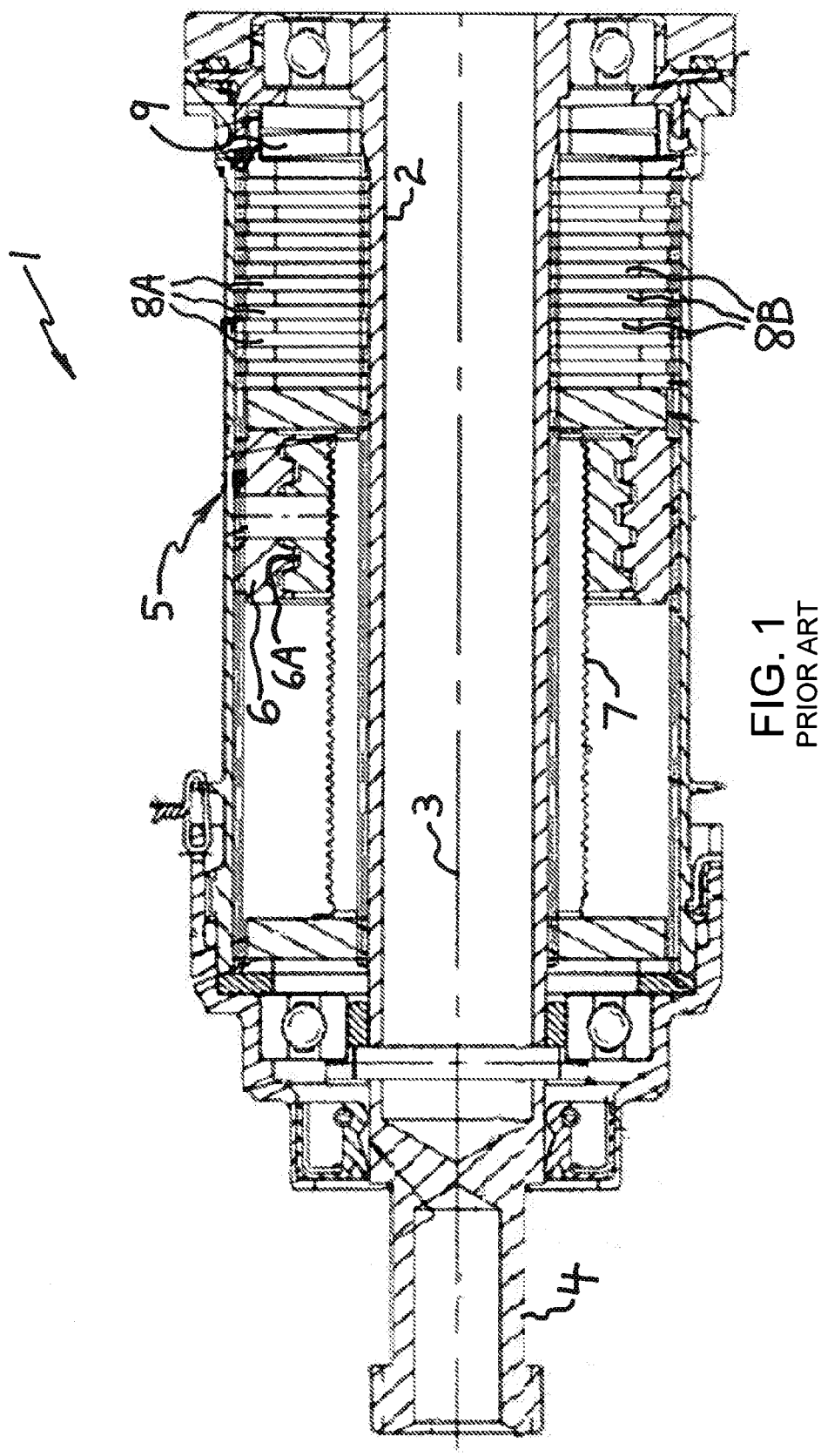
FIG. 1 is a longitudinal cross-sectional view of a rotational system and stop module of the prior art.
Figure 2:
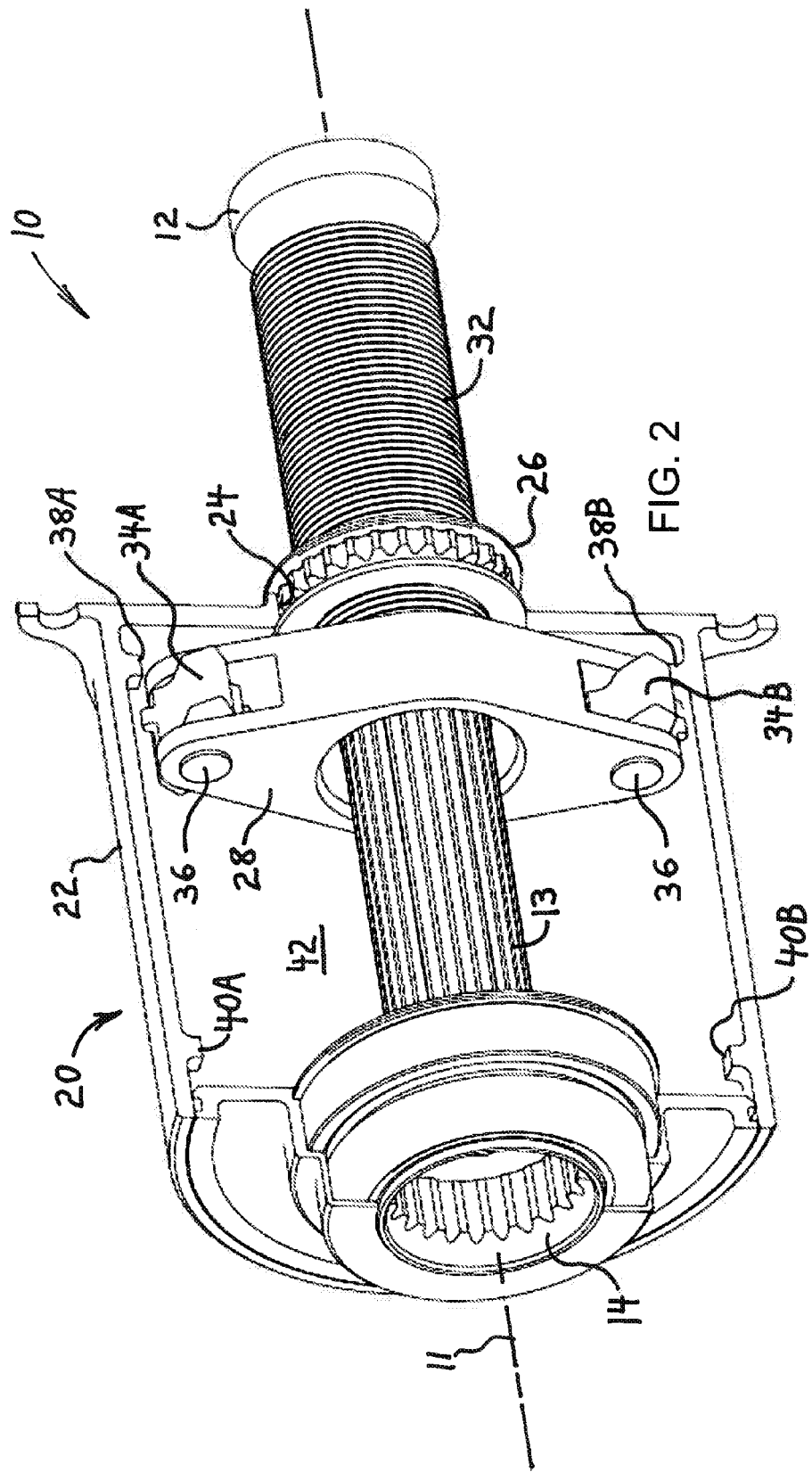
FIG. 2 is a longitudinally cross-sectioned perspective view showing a rotational system stop module formed in accordance with an embodiment of the present invention.

FIG. 2 illustrates a rotational drive system 10 comprising an input shaft 12 and an internally-splined output coupling 14 fixedly attached to an end of input shaft 12 for rotation with input shaft 12 about axis 11. Rotational drive system 10 further comprises a stop module 20 formed in accordance with an embodiment of the present invention. Stop module 20 limits the number of revolutions that input shaft 12 can make about axis 11 in either rotational direction, thereby limiting the stroke extents associated with a driven actuator rod (not shown).

Figure 3:
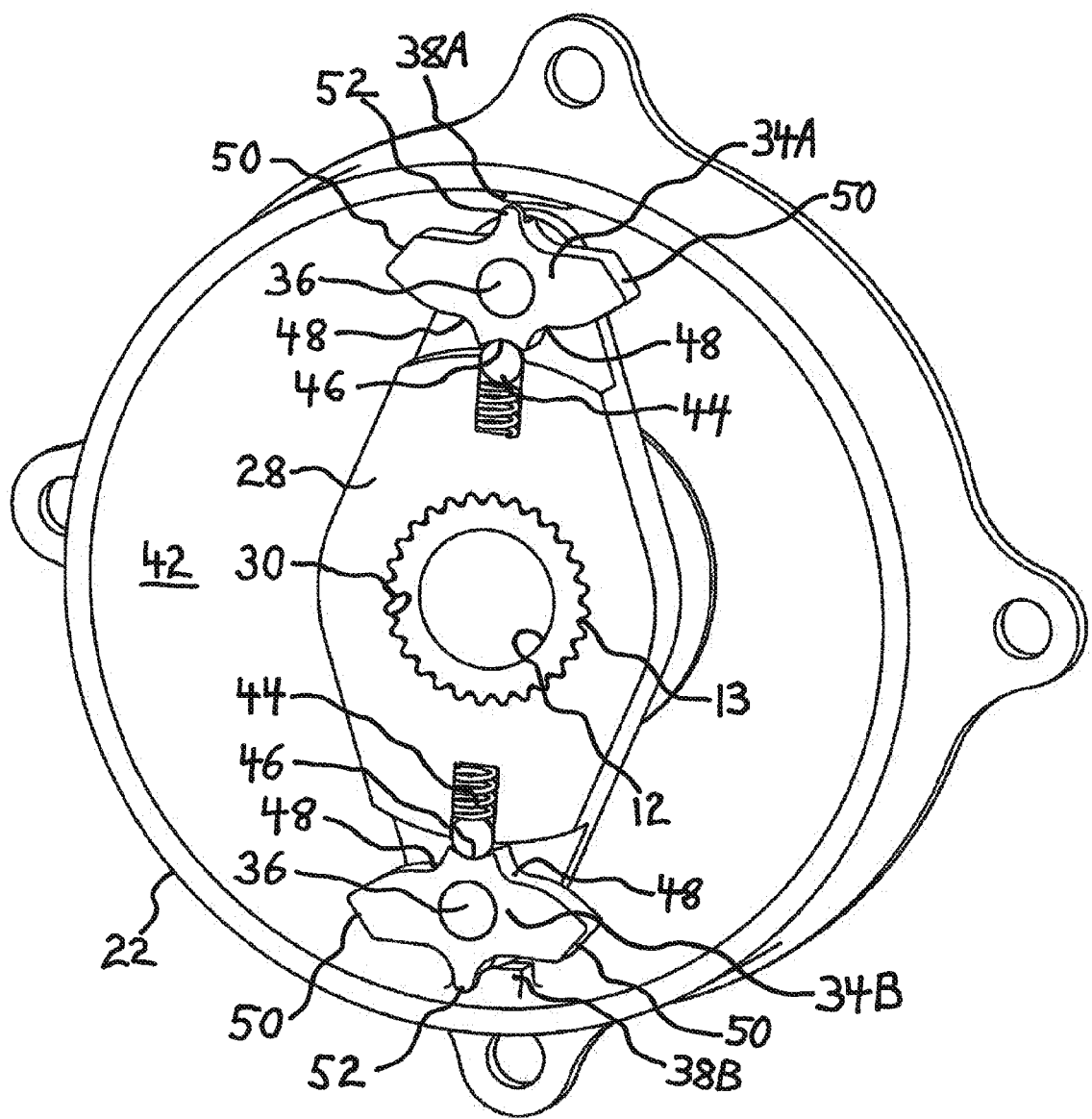
FIG. 3 is a transversely cross-sectioned perspective view of the stop module shown in FIG. 2.
Figure 4A:
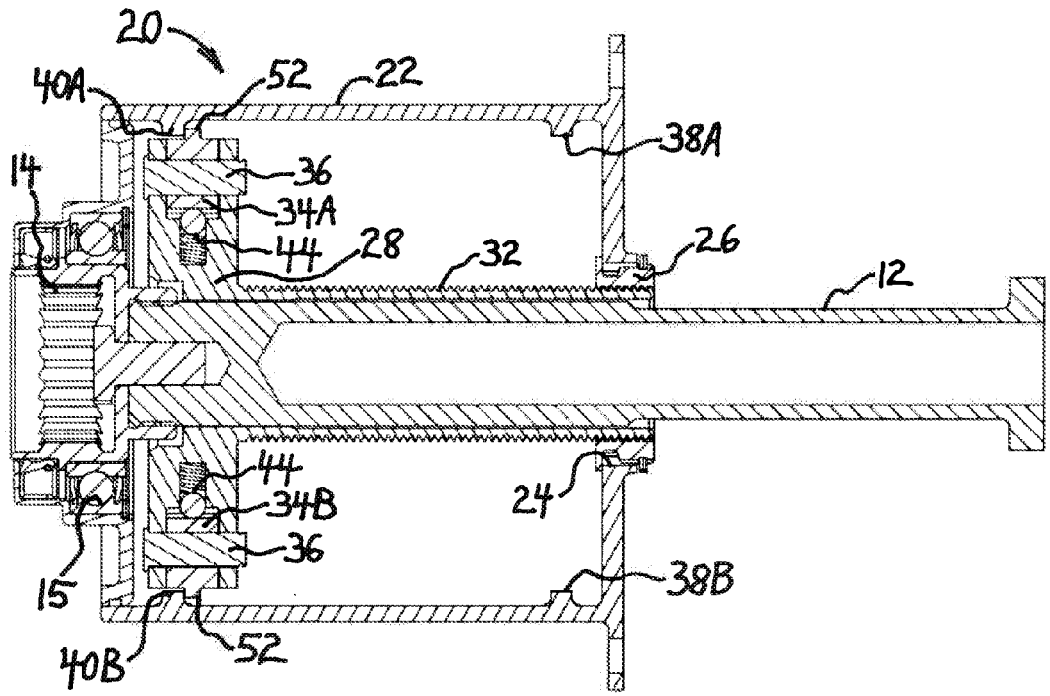
FIG. 4A is a longitudinal cross-sectional view of the stop module shown in FIGS. 2 and 3, wherein a pawl carrier of the stop module is shown as it approaches a first axial limit position defined by the stop module.
Figure 4B:
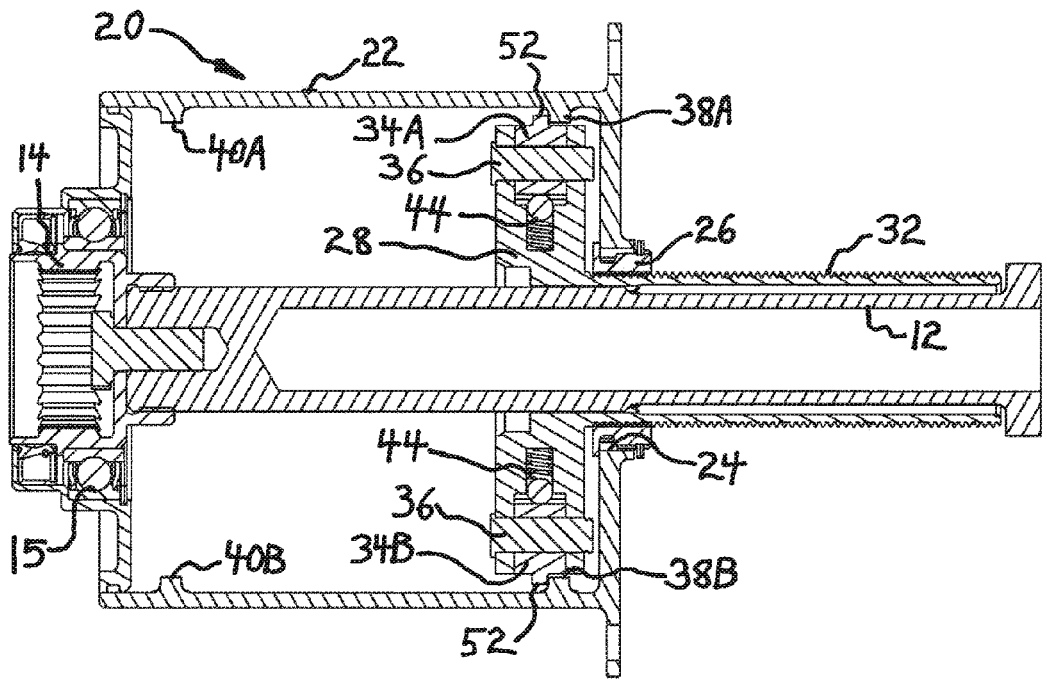
FIG. 4B is a view similar to that of FIG. 4A, wherein the pawl carrier of the stop module is shown as it approaches a second axial limit position defined by the stop module.

Reference is made also to FIGS. 3, 4A, and 4B. In the depicted embodiment, stop module 20 comprises a generally cylindrical housing 22 having an opening 24 through which input shaft 12 extends into the housing. Stop module also comprises a nut 26 set at a fixed location in an axial direction of input shaft 12. As shown in FIGS. 4A and 4B, nut 26 may be arranged at opening 24 of housing 22 to surround input shaft 12. Nut 26 may be separately machined and fixedly mounted to housing 22, or nut 26 may be an internally-threaded collar portion integrally formed in housing 22 around opening 24.

Stop module 20 further comprises a pawl carrier 28 coaxially mounted on input shaft 12 for axial travel along the input shaft and rotation with the input shaft. For example, pawl carrier may include a central splined opening 30 through which input shaft 12 extends, and input shaft 12 may have an externally splined portion 13 mating with splined opening 30, whereby pawl carrier 28 is free to slide axially along input shaft 12 and is constrained to rotate with input shaft 12 about axis 11. Pawl carrier 28 includes a screw portion 32 threadably mated with nut 26 such that rotation of pawl carrier 28 with input shaft 12 causes pawl carrier 28 to travel axially along the input shaft. As will be understood, rotation of shaft 12 and pawl carrier 28 in a first rotational direction will cause pawl carrier 28 to travel in a first axial direction along input shaft 12, e.g. to the left in FIGS. 4A and 4B, and rotation of shaft 12 and pawl carrier 28 in a second rotational direction opposite the first rotational direction will cause pawl carrier 28 to travel in a second axial direction along input shaft 12, e.g. to the right in FIGS. 4A and 4B.

As best seen in FIG. 3, the illustrated stop module 20 comprises a pair of pawl members 34A, 34B pivotally coupled to pawl carrier 28 by pivot pins 36 and angularly spaced from one another about axis 11. In an advantageous arrangement, pawl members 34A, 34B may be provided at diametrically opposite locations relative to axis 11, such that rotation is balanced about axis 11. Stop module 20 of FIG. 3 additionally comprises a first pair of stop elements 38A, 38B fixed at a first axial limit location in an axial direction of input shaft 12, and a second pair of stop elements 40A, 40B fixed at a second axial limit location in an axial direction of input shaft 12. Each stop element 38A, 38B, 40A, 40B projects radially inward toward the rotational axis 11 of input shaft 12. For example, stop element 38A, 38B, 40A, 40B may be fixed to extend from an inner wall surface 42 of housing 22, or may be integrally formed as part of housing 22.

In accordance with the present invention, pawl carrier 28 is axially displaceable from a non-limit position wherein pawl members 34A, 34B are clear of stop elements 38A, 38B and stop elements 40A, 40B in all rotational positions of pawl carrier 28 about the axis 11, to a limit position wherein pawl members 34A, 34B are interfered with by stop elements 38A, 38B or by stop elements 40A, 40B as pawl carrier 28 rotates about axis 11 so as to stop the rotation of input shaft 12 and pawl carrier 28. In the embodiment shown, stop elements 38A, 38B are fixed at a first axial limit location, and stop elements 40A, 40B are fixed at a second axial limit location spaced apart from the first axial limit location in the axial direction of input shaft 12. Each axial limit location may have a pair of stop elements diametrically opposite from one another about axis 11.

Reference is also made now to FIGS. 5A through 5E for describing how pawl members 34A, 34B are interfered with by stop elements at an axial limit position to stop rotation of pawl carrier 28 and input shaft 12. In the figures, the first axial limit position defined by stop elements 38A, 38B is used for sake of illustration, however the description applies also to the second axial limit position defined by stop elements 40A, 40B.

Figure 5A:
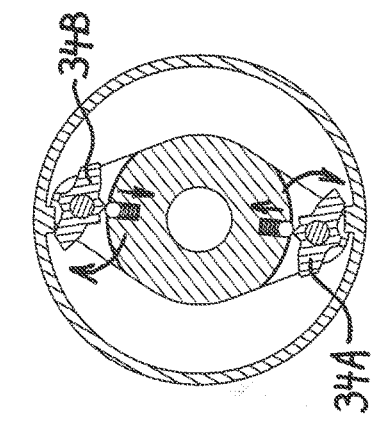
FIGS. 5A through 5E are a series of transverse cross-sectional views schematically illustrating operation of a pawl mechanism of the stop module to stop rotation.

As best seen in FIGS. 3 and 5A, each pawl member 34A, 34B is releasably held in a neutral pivot position as shown in by a radially-directed spring-loaded ball plunger 44 seated in pawl carrier 28. When each pawl member 34A, 34B is in its neutral position, the corresponding ball plunger 44 engages a central recess 46 of the pawl member. Each pawl member 34A, 34B may also include lateral recesses 48 on opposite sides of central recess 46 for engagement by ball plunger 44 when the pawl member pivots about an axis defined by pivot pin 36, as will be described later below.

Each pawl member 34A, 34B may have a pair of catch members 50 extending in opposite lateral directions relative to pivot pin 36, and an outer tab 52 in radial alignment with ball plunger 44. As will be understood, tabs 52 of pawl members 34A, 34B are not axially aligned with stop elements 38A, 38B when pawl carrier 28 is in an axial non-limit position, such that tabs 52 are clear of stop elements 38A, 38B in all rotational positions of pawl carrier 28 about axis 11. Consequently, under normal operating conditions wherein pawl carrier 28 is in an axial non-limit position, pawl carrier 28 is free to rotate relative housing 22 unimpeded by stop elements 38A, 38B so input shaft 12 can freely rotate about axis 11.

Figure 5B:
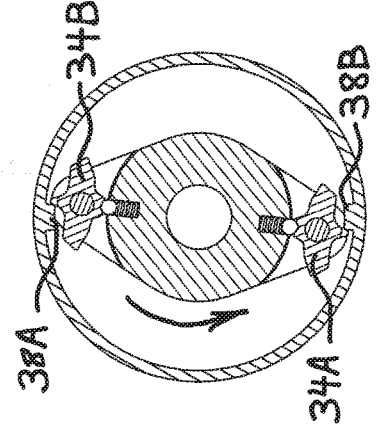
Figure 5C:
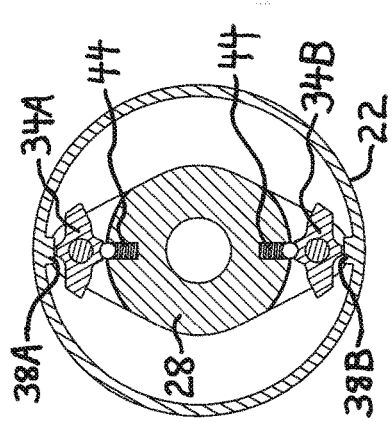
Figure 5E:
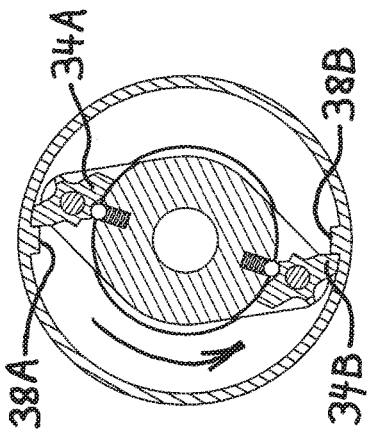
Figure 5D:
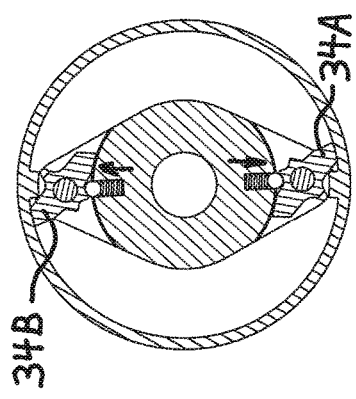

By contrast, when pawl carrier 28 reaches an axial limit position defined by stop elements 38A, 38B at one end of stop module 20 or by stop elements 40A, 40B at the other end of stop module 20, tabs 52 will engage the stop elements in a manner that reversibly stops rotation of pawl carrier 28 and input shaft 12. In FIG. 5A, pawl carrier 28 just before it reaches the axial limit position defined by stop elements 38A, 38B. As will be understood, pawl carrier 28 is rotating together with input shaft 12 and is moving axially along the input shaft until pawl carrier 28 reaches the limit position defined by stop elements 38A, 38B. As shown in FIG. 5B, when pawl carrier 28 reaches the axial limit position, stop elements 38A, 38B interfere radially with the rotational travel path of tabs 52 on pawl members 34A, 34B. As pawl carrier 28 rotates, tab 52 of pawl member 34A engages stop element 38A and tab 52 of pawl member 34B engages stop element 38B. FIG. 5C shows that the continued rotation of pawl carrier 28 about axis 11 is accompanied by pivoting of pawl members 34A, 34B about respective pivot axes defined by pivot pins 36, thereby compressing ball plungers 44 as each ball plunger moves out of central recess 46 in the corresponding pawl member. Rotation of pawl carrier 28 continues, accompanied by further pivoting of pawl members 34A, 34B, until ball plunger 44 resiliently decompresses and is received within a lateral recess 48 in the associated pawl member, as may be seen in FIG. 5D. At this stage, each pawl member 34A, 34B is set in a lockout pivot position wherein one of its catch members 50 will engage against a corresponding stop element 38A, 38B and the other catch member 50 will be braced against pivoting by engagement with pawl carrier 28. As pawl carrier 42 continues to rotate about main axis 11, each cocked pawl member 34A, 34B will engage the next stop element 38A or 38B as shown in FIG. 5E to halt rotation of pawl carrier 28 and input shaft 12.

Figure 6A:
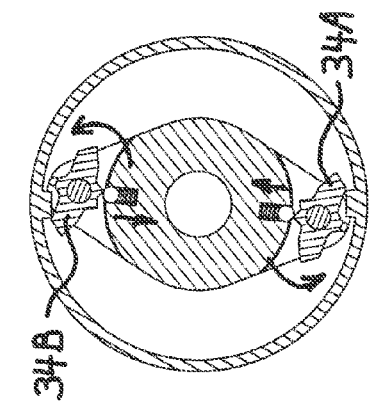
FIGS. 6A through 6E are a series of transverse cross-sectional views schematically illustrating resetting of the pawl mechanism of the stop module by counter-rotation.
Figure 6B:
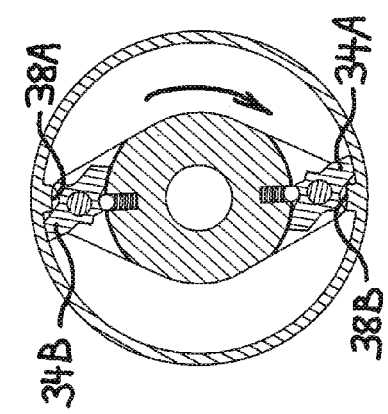
Figure 6C:
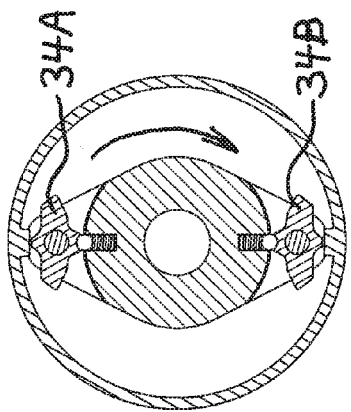
Figure 6D:
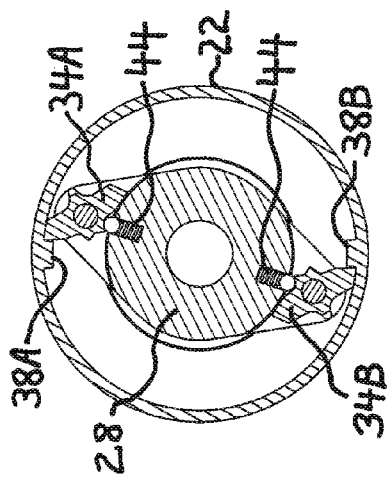
Figure 6E:
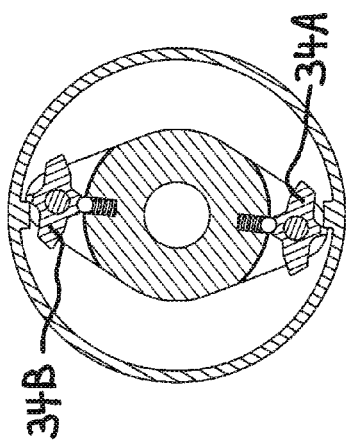

FIGS. 6A-6E illustrate how pawl carrier 28 and pawl members 34A, 34B may be reset by commanding counter-rotation of input shaft 12 to thereby counter-rotate pawl carrier 28. Pawl carrier 28 and pawl members 34A, 34B begin from the full lockout condition depicted in FIG. 6A (this is the same condition shown in FIG. 5E). Pawl carrier 28 is counter-rotated until the trailing, radially outer catch member 50 of each pawl member engages the previous stop element 34A or 34B as shown in FIG. 6B. As may be understood from FIG. 6C, this causes each pawl member 34A, 34B to pivot about the axis of corresponding pivot pin 36, thereby compressing ball plunger 44 as pawl carrier 28 continues its counter-rotation. Proceeding to FIG. 6D, it will be seen that further counter-rotation of pawl carrier 28 causes each pawl member 34A, 34B to continue pivoting until the respective ball plunger 44 resiliently decompresses and is received in central recess 46. During this counter-rotation, pawl carrier 28 moves axially a slight distance along input shaft 12. Consequently, as shown in FIG. 6E, each pawl member 34A, 34B is now reset and pawl carrier is at a non-limit position wherein tabs 52 have clearance relative to stop elements 38A, 38B.

In the embodiment illustrated herein, stop module 20 has two axial limit locations. However, stop module may have only one axial limit location and still be within the scope of the present invention. The depicted stop module 20 has a pair of stop elements at each axial limit location, but the invention may be practiced with only one stop element at a given axial limit location, or may be practiced with more than two stop elements at a given axial limit location. Furthermore, the illustrated embodiment has a pair of pawl members 34A, 34B on pawl carrier 28, however stop module 20 may have only one pawl member on pawl carrier 28, or may have more than two pawl members on pawl carrier 28, without straying from the scope of the invention. A balanced distribution of pawl members about axis 11 is desirable to maintain rotational balance and avoid shaft wobble and vibration.

The stop module described herein solves the problems associated with stop modules of the prior art. First, the invention eliminates the friction disc brake plates and replaces them with a pawl lockout mechanism. This change removes a source of power loss caused by viscous drag torque. Second, the invention prevents development of inaccuracies in the axial limit positions over time due to frictional wear of the brake plates. As another benefit of the invention, significant reduction in the weight of the stop module and associated rotational drive system may be achieved.

Embodiments of the present invention are described in detail herein, however those skilled in the art will realize that modifications may be made. Such modifications do not stray from the scope of the invention as defined by the appended claims.

PARTS LIST

10 Rotational drive system
11 Rotational axis
12 Input shaft
13 Splined portion of input shaft
14 Output coupling
15 Rotary bearing
20 Stop module
22 Housing
24 Opening in housing
26 Nut
28 Pawl carrier
30 Opening in pawl carrier
32 Screw portion of pawl carrier
34A, 34B Pawl members
36 Pivot pin
38A, 38B Stop elements
40A, 40B Stop elements
42 Inner wall surface of housing
44 Ball plunger
46 Central recess in pawl member
48 Lateral recess in pawl member
50 Catch member of pawl member
52 Tab of pawl member

What is claimed is:

1. A stop module for a rotational drive system having a shaft rotatable about an axis, the stop module comprising:
a nut at a fixed location in an axial direction of the shaft;
a pawl carrier coaxially mounted on the shaft for axial travel along the shaft and rotation with the shaft, wherein the pawl carrier includes a screw portion mated with the nut such that rotation of the pawl carrier with the shaft causes the pawl carrier to travel axially along the shaft;
at least one pawl member pivotally coupled to the pawl carrier for travel therewith; and
at least one stop element fixed at an axial limit location in an axial direction of the shaft, the stop element projecting radially inward toward the rotational axis of the shaft;
wherein the pawl carrier is axially displaceable from a non-limit position wherein the at least one pawl member is clear of the at least one stop element in all rotational positions of the pawl carrier about the rotational axis of the shaft to a limit position wherein the at least one pawl member is interfered with by the at least one stop element as the pawl carrier rotates about the rotational axis of the shaft so as to stop rotation of the input shaft and pawl carrier.

2. The stop module according to claim 1, wherein the stop module comprises a first stop element fixed at a first axial limit location and a second stop element fixed at a second axial limit location spaced apart from the first axial limit location in the axial direction of the shaft.

3. The stop module according to claim 1, wherein the stop module comprises a pair of angularly spaced stop elements fixed at the axial limit location, and a pair of angularly spaced pawl members pivotally coupled to the pawl carrier.

4. The stop module according to claim 1, further comprising a housing in which the pawl member is received, wherein the stop element projects inwardly from an inner wall surface of the housing.

5. The stop module according to claim 1, further comprising a housing having an opening through which the shaft extends into the housing, wherein the nut is arranged at the opening of the housing.

6. The stop module according to claim 1, wherein the pawl carrier and the at least one pawl member are resettable by counter-rotating the shaft after the pawl carrier has reached the limit position.

* * * * *